(12) United States Patent
Ji et al.

(10) Patent No.: US 8,889,078 B2
(45) Date of Patent: Nov. 18, 2014

(54) POROUS OXIDE CATALYST AND METHOD OF PREPARING THE POROUS OXIDE CATALYST

(75) Inventors: Sang-min Ji, Yongin-si (KR); Hyun-chul Lee, Yongin-si (KR); Doo-hwan Lee, Yongin-si (KR); Seon-ah Jin, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 514 days.

(21) Appl. No.: 13/048,382

(22) Filed: Mar. 15, 2011

(65) Prior Publication Data
US 2011/0230337 A1 Sep. 22, 2011

(30) Foreign Application Priority Data

Mar. 17, 2010 (KR) .................. 10-2010-0023822

(51) Int. Cl.
*B01J 23/00* (2006.01)
*B01J 21/00* (2006.01)
(Continued)

(52) U.S. Cl.
CPC ............ *B01J 23/002* (2013.01); *B01J 37/0236* (2013.01); *B01J 37/082* (2013.01); *B01J 35/1061* (2013.01); *B01J 37/086* (2013.01); *B01D 53/864* (2013.01); *B01D 2255/40* (2013.01); *B01J 35/1038* (2013.01); *B01J 37/009* (2013.01); *B01D 2255/9205* (2013.01); *B01D 2255/20715* (2013.01); *B01D 2257/708* (2013.01); *B01J 2523/00* (2013.01); *B01D 2255/1023* (2013.01); *B01J 23/83* (2013.01); *B01D 2255/2065* (2013.01); *B01J 23/894* (2013.01); *B01J 35/1014* (2013.01); *B01D 2255/20761* (2013.01); *B01J 37/03* (2013.01)

USPC ........... 422/170; 502/240; 502/241; 502/242; 502/243; 502/244; 502/245; 502/246; 502/247; 502/248; 502/249; 502/250; 502/251; 502/252; 502/253; 502/254; 502/255; 502/256; 502/257; 502/258; 502/259; 502/260; 502/261; 502/262; 502/263; 502/304; 502/305; 502/306; 502/307; 502/308; 502/309; 502/310; 502/311; 502/312; 502/313; 502/314; 502/315; 502/316; 502/317; 502/318; 502/319; 502/320; 502/321; 502/322; 502/323; 502/324; 502/325; 502/326; 502/327; 502/328; 502/329; 502/330; 502/331; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350; 502/351; 502/352; 502/353; 502/354; 502/355; 502/415; 502/439; 502/300; 422/177; 422/180

(58) Field of Classification Search
USPC .......... 502/240–263, 300–439; 422/170, 177, 422/180
See application file for complete search history.

(56) References Cited

U.S. PATENT DOCUMENTS 4,261,862 A * 4/1981 Kinoshita et al. ............. 502/304
4,263,020 A * 4/1981 Eberly, Jr. ...................... 95/136
(Continued)

FOREIGN PATENT DOCUMENTS

JP 2005-305245 A 11/2005
KR 10-0390770 A 7/2002
(Continued)

OTHER PUBLICATIONS

European Extended Search Report for Application No. 11158664.0 dated Jan. 25, 2012.

Primary Examiner — Cam N. Nguyen
(74) Attorney, Agent, or Firm — Cantor Colburn LLP

(57) ABSTRACT

A porous oxide catalyst includes porous oxide, and an oxygen vacancy-inducing metal which induces an oxygen vacancy in a lattice structure of a porous metal oxide.

22 Claims, 16 Drawing Sheets

(51) Int. Cl.
| | |
|---|---|
| *B01J 20/00* | (2006.01) |
| *B01D 50/00* | (2006.01) |
| *B01D 53/34* | (2006.01) |
| *B01J 37/02* | (2006.01) |
| *B01J 37/08* | (2006.01) |
| *B01J 35/10* | (2006.01) |
| *B01D 53/86* | (2006.01) |
| *B01J 37/00* | (2006.01) |
| *B01J 23/83* | (2006.01) |
| *B01J 23/89* | (2006.01) |
| *B01J 37/03* | (2006.01) |

(56) References Cited

U.S. PATENT DOCUMENTS

| | | | | |
|---|---|---|---|---|
| 4,274,981 | A * | 6/1981 | Suzuki et al. | 502/178 |
| 4,297,333 | A * | 10/1981 | Crawford et al. | 423/241 |
| 4,985,387 | A * | 1/1991 | Prigent et al. | 502/304 |
| 5,457,268 | A | 10/1995 | Greene et al. | |
| 5,500,198 | A | 3/1996 | Liu et al. | |
| 6,447,741 | B1 * | 9/2002 | Chester et al. | 423/305 |
| 6,458,741 | B1 | 10/2002 | Roark et al. | |
| 7,223,716 | B1 * | 5/2007 | Koike et al. | 502/439 |
| 7,235,507 | B2 * | 6/2007 | Xu et al. | 502/63 |
| 7,332,454 | B2 * | 2/2008 | Dang et al. | 502/60 |
| 7,541,311 | B2 * | 6/2009 | Chen et al. | 502/345 |
| 7,560,410 | B2 * | 7/2009 | Pillai et al. | 502/304 |
| 7,723,263 | B2 * | 5/2010 | Koike et al. | 502/439 |
| 7,824,656 | B2 * | 11/2010 | Idem et al. | 423/651 |
| 8,071,655 | B2 * | 12/2011 | Diehl et al. | 518/715 |
| 8,143,186 | B2 * | 3/2012 | Rytter | 502/260 |
| 2005/0081443 | A1 | 4/2005 | Aiello et al. | |
| 2009/0269269 | A1 * | 10/2009 | White et al. | 423/437.2 |
| 2009/0272943 | A1 * | 11/2009 | Chartier et al. | 252/373 |
| 2009/0302275 | A1 * | 12/2009 | Chartier et al. | 252/373 |
| 2010/0303712 | A1 | 12/2010 | Nagaoka et al. | 423/651 |
| 2011/0053020 | A1 * | 3/2011 | Norton et al. | 429/425 |
| 2011/0124488 | A1 * | 5/2011 | Neltner et al. | 502/7 |

FOREIGN PATENT DOCUMENTS

| | | |
|---|---|---|
| WO | 01/45833 A1 | 6/2001 |
| WO | 2010/123731 A1 | 10/2010 |

* cited by examiner

POROUS OXIDE CATALYST AND METHOD OF PREPARING THE POROUS OXIDE CATALYST

CROSS-REFERENCE TO RELATED APPLICATIONS

This application claims priority to Korean Patent Application No. 10-2010-0023822, filed on Mar. 17, 2010, and all the benefits accruing therefrom under 35 U.S.C. §119, the content of which in its entirety is herein incorporated by reference.

BACKGROUND

1. Field

The present disclosure relates to a porous oxide catalyst and a method of preparing the same. Such catalysts may be used to remove various volatile organic compounds.

2. Description of the Related Art

In general, a volatile organic compound ("VOC") is oxidized and thus decomposed by an activated oxygen species, which may be formed on a surface of a catalyst. An activated oxygen species is known to be formed from an oxygen molecule, which is adsorbed at a surface oxygen vacancy site of a metal oxide.

Commercially, a surface oxygen vacancy is formed by reducing a surface of an oxide using a hydrogen containing gas (e.g., forming gas) at a high temperature to form water (e.g., $H_2+O \rightarrow H_2O$), or by supporting a metal oxide on a surface of a carrier having a high surface area, and contacting the metal oxide with a hydrogen containing gas to form a surface oxygen vacancy. However, the surface oxygen vacancy formed by hydrogen reduction is unstable and the surface oxygen vacancy containing oxide is easily re-oxidized, or the crystal structure of the oxide containing the surface oxygen vacancy may collapse to form a different a crystal structure of the oxide, either of which eliminates the oxygen vacancy. In addition, if a carrier is used, the surface area of the carrier supporting by the metal oxide may decrease, or a multi-step synthesis process may be used to provide a desired material. However, both a loss of carrier surface area or synthesis processes including multiple steps are economically undesirable.

Therefore there remains a need for an improved porous oxide catalyst and method of preparing the same.

SUMMARY

Provided is a porous oxide catalyst with enhanced volatile organic compound (VOC) oxidation and/or decomposition efficiency.

Provided is a method of preparing the porous oxide catalyst.

Additional aspects, features, and advantages will be set forth in part in the description which follows and, in part, will be apparent from the description.

According to an aspect, a porous oxide catalyst includes: a porous metal oxide; and an oxygen vacancy-inducing metal that induces an oxygen vacancy in a lattice structure of the porous metal oxide.

The porous oxide catalyst may further include an active metal disposed on a surface of the porous oxide catalyst.

The porous metal oxide may include at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth.

The porous metal oxide may be at least one of ZnO, $TiO_2$, $SiO_2$, $Ce_xZr_{1-x}O_2$ wherein x is greater than or equal to about 0 and less than or equal to about 1, $SiO_2$—$Al_2O_3$, $SiO_2$—$ZrO_2$, $Al_2O_3$—$ZrO_2$, or $CeO$—$ZrO_2$.

The oxygen vacancy-inducing metal may be at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), rhodium (Rh), palladium (Pd), silver (Ag), cadmium (Cd), indium (In), tin (Sn), tantalum (Ta), tungsten (W), iridium (Ir), platinum (Pt), gold (Au), lead (Pb), or bismuth (Bi).

The active metal may be at least one of platinum (Pt), palladium (Pd), ruthenium (Ru), rhodium (Rh), nickel (Ni), copper (Cu), silver (Ag), or gold (Au).

The oxygen vacancy-inducing metal may have a lower oxidation number than that of a metal included in the porous metal oxide.

A ratio of the oxidation number of the oxygen vacancy-inducing metal to the oxidation number of the metal included in the porous metal oxide may be less than about 1.

The amount of the active metal may be about 1 to about 50 parts by weight, based on 100 parts by weight of the porous metal oxide.

The amount of the oxygen vacancy-inducing metal may be about 0.1 to about 20 parts by weight, based on 100 parts by weight of the porous metal oxide.

The oxygen vacancy-inducing metal may be disposed in the lattice structure of the porous metal oxide.

The porous oxide catalyst may include a mesopore having an average largest diameter of about 2 to about 50 nanometers.

Also disclosed is a pollutant removal device including the porous oxide catalyst. The pollutant removal device may be used to remove a volatile organic compound (VOC) or other pollutant.

The porous oxide catalyst may be prepared by evaporation-induced self-assembly or co-precipitation.

According to another aspect, a method of preparing a porous oxide catalyst includes: contacting a metal oxide precursor, an oxygen vacancy-inducing metal precursor, and a solvent to prepare a mixture; drying the mixture; aging the mixture; and sintering the mixture to prepare the porous oxide catalyst.

According to another aspect, a method of preparing a porous oxide catalyst includes: contacting a metal oxide precursor, an oxygen vacancy-inducing metal precursor, and water to prepare an aqueous dispersion; contacting an aqueous basic solution with the aqueous dispersion to form mixture including a precipitate; isolating the precipitate from the mixture; and sintering the precipitate to prepare the porous oxide catalyst.

According to another aspect, an apparatus for removing a volatile organic compound ("VOC") includes the porous oxide catalyst.

Also disclosed is a porous oxide catalyst including: a porous metal oxide including at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth; an active metal including at least one of platinum, palladium, ruthenium, rhodium, nickel, copper, silver or gold; and an oxygen vacancy-inducing metal including at least one of iron, cobalt, copper, manganese, nickel, zinc, or silver, wherein the oxygen vacancy-inducing metal has a lower oxidation number than that of a metal of the porous metal oxide.

Also disclosed is a method of preparing a porous oxide catalyst, the method including: contacting a metal oxide precursor, an oxygen vacancy-inducing metal precursor, an active metal precursor, and water to prepare an aqueous dispersion; adding an aqueous basic solution to the aqueous dispersion to form mixture including a precipitate; isolating the precipitate from the mixture; and sintering the precipitate to prepare a porous oxide catalyst, wherein metal oxide precursor is at least one of an alkoxide, a halide, a nitrate, a hydrochloride, a sulfate, or an acetate of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth, the oxygen vacancy-inducing metal is at least one of an alkoxide, a halide, a nitrate, a hydrochloride, a sulfate, or an acetate of at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), rhodium (Rh), palladium (Pd), silver (Ag), cadmium (Cd), indium (In), tin (Sn), tantalum (Ta), tungsten (W), iridium (Ir), platinum (Pt), gold (Au), lead (Pb), or bismuth (Bi), and the active metal precursor is at least one of an alkoxide, a halide, a nitrate, a hydrochloride, a sulfate, or an acetate of at least one of platinum (Pt), palladium (Pd), ruthenium (Ru), rhodium (Rh), nickel (Ni), copper (Cu), silver (Ag), or gold (Au).

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
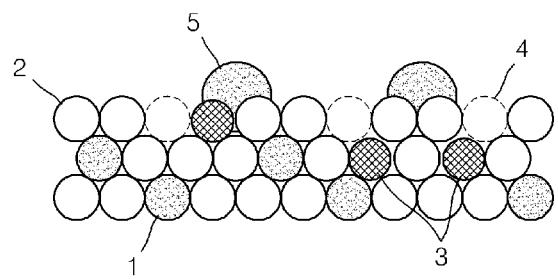
FIG. 1A is a schematic diagram illustrating an exemplary embodiment of an oxygen vacancy in a porous oxide catalyst.

Reference will now be made in detail to embodiments, examples of which are illustrated in the accompanying drawings, wherein like reference numerals refer to like elements throughout. In this regard, the disclosed embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, unless otherwise provided, the term "Group" refers to a group of the periodic table of the elements according to the International Union of Pure and Applied Chemistry ("IUPAC") 1-18 Group classification system.

As used herein, an alkoxide is a compound comprising an alkoxy group, wherein alkoxy refers to an alkyl moiety that is linked via an oxygen (i.e., —O-alkyl). Non-limiting examples of C1-C30 alkoxy groups include methoxy groups, ethoxy groups, propoxy groups, isobutoxy groups, sec-butoxy groups, pentoxy groups, iso-amyloxy groups, and hexoxy groups.

As used herein, an acetate refers to a salt formed by reaction of the designated compound with acetic acid.

As used herein, standard temperature and pressure ("STP") refers to a temperature of 20 degrees centigrade and a pressure of 101 kilopascals.

A porous oxide catalyst includes a porous metal oxide and an oxygen vacancy-inducing metal included in a lattice structure of the porous metal oxide, and may further include an active metal supported thereon.

Figure 1B:
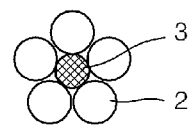
FIG. 1B is a schematic diagram of an exemplary embodiment of an oxygen vacancy-inducing metal and oxygen atoms bound to the oxygen vacancy-inducing metal.
Figure 1C:
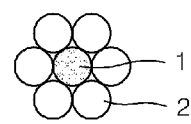
FIG. 1C is a schematic diagram of an exemplary embodiment of a lattice metal and oxygen atoms bound to the lattice metal.

A representative embodiment of the porous oxide catalyst is illustrated in FIG. 1A. The porous oxide catalyst comprises a lattice metal atom 1, an oxygen atom 2, and a hetero-metal 3. The oxygen atom 2, may be disposed on a surface of the porous oxide catalyst, and thus may be a surface oxygen atom. Also, the hetero-metal may be a transition metal, and may be an oxygen vacancy-inducing metal. The porous oxide catalyst may further comprise (e.g., define) an oxygen vacancy 4, which may be induced by the hetero-metal. Also, the porous oxide catalyst may further comprise an active metal 5 disposed on a surface of the porous oxide catalyst. In an embodiment, the hetero-metal may have a valence such that it is bound to fewer oxygen atoms than the lattice metal, as is illustrated in FIGS. 1B and 1C.

While not wanting to be bound by theory, it is believed that the oxygen vacancy-inducing metal included in the porous oxide catalyst, as illustrated in FIG. 1A, may be disposed on (e.g., inserted and/or substituted into) the lattice structure of the porous metal oxide on a lattice metal site or on an oxygen site of the porous oxide catalyst, thereby causing a local charge imbalance in the porous metal oxide. The local charge imbalance is believed to cause an oxygen vacancy, which forms to resolve the local charge imbalance.

Figure 2:
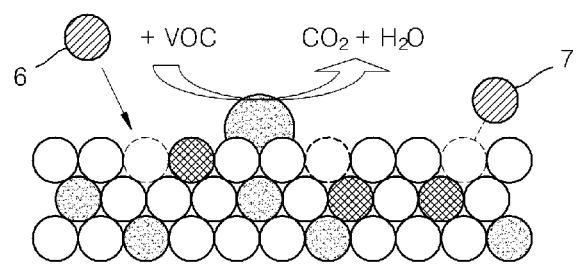
FIG. 2 is a schematic diagram illustrating an exemplary embodiment of oxidation of a volatile organic compound ("VOC") by a porous oxide catalyst.

Referring to FIG. 2, the oxygen vacancy is easily formed on a surface of the porous metal oxide, and the formed oxygen vacancy facilitates adsorption of an oxygen molecule onto the porous metal oxide and formation of an activated oxygen species, which may be an activated oxygen atom 6 or an activated oxygen molecule 7. The activated oxygen species may be adsorbed at an oxygen vacancy site of the porous oxide catalyst. The activated oxygen species may enhance an oxidation efficiency and/or decomposition efficiency of a volatile organic compound ("VOC"), which contacts the activated oxygen species. Thus, the activated oxygen species may combine with the VOC to provide carbon dioxide and water. The oxidation of the VOC can also be represented by the following Reaction Scheme 1.

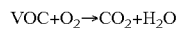

$$VOC + O_2 \rightarrow CO_2 + H_2O \qquad \text{Reaction Scheme 1}$$

The porous metal oxide constituting the lattice structure of the porous oxide catalyst may be any porous metal oxide used as a catalyst. For example, the porous metal oxide may be at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth. For example, the porous metal oxide may be at least one of ZnO, $TiO_2$, $SiO_2$, $Ce_xZr_{1-x}O_2$ wherein x is greater than or equal to about 0 and less than or equal to about 1, $SiO_2$—$Al_2O_3$, $SiO_2$—$ZrO_2$, $Al_2O_3$—$ZrO_2$, or CeO—$ZrO_2$.

The porous metal oxide may be crystalline or non-crystalline, and the structure of the porous metal oxide may be determined by analyzing a structure of the resulting product.

The oxygen vacancy-inducing metal, which may be inserted and/or substituted into the lattice structure of the porous metal oxide, may be at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), rhodium (Rh), palladium (Pd), silver (Ag), cadmium (Cd), indium (In), tin (Sn), tantalum (Ta), tungsten (W), iridium (Ir), platinum (Pt), gold (Au), lead (Pb), or bismuth (Bi).

The oxygen vacancy-inducing metal may be a metal having a lower oxidation number (e.g., stable oxidation state) than that of a metal included in the porous metal oxide. For example, a ratio of the oxidation number of the oxygen vacancy-inducing metal to the oxidation number of the metal included in the porous metal oxide may be less than 1, specifically greater than 0 and less than about 0.9, more specifically greater than 0 and less than or equal to about 0.75.

As further disclosed above, the porous oxide catalyst comprises the porous metal oxide and the oxygen vacancy-inducing metal, and may further include an active metal supported on the surface of the porous oxide catalyst. The active metal may be any metal having catalytic activity, and, for example, may be at least one of platinum (Pt), palladium (Pd), ruthenium (Ru), rhodium (Rh), nickel (Ni), copper (Cu), silver (Ag), or gold (Au).

In the porous oxide catalyst, the amount of the oxygen vacancy-inducing metal may be about 0.1 to about 20 parts by weight, specifically about 0.5 to about 15 parts by weight, more specifically about 1 to about 12 parts by weight, based on 100 parts by weight of the porous metal oxide, and the amount of the active metal, which may be additionally included in the porous oxide catalyst, may be about 1 to about 50 parts by weight, specifically about 2 to about 40 parts by weight, more specifically about 4 to about 30 parts by weight, based on 100 parts by weight of the porous metal oxide.

The porous oxide catalyst may further comprise mesopores, and the porous oxide catalyst may have a high surface area and a high pore area. For example, the porous oxide catalyst may comprise mesopores, each having a diameter (e.g., an average largest diameter) of about 1 to about 50 nanometers (nm), specifically about 2 to about 30 nm, more specifically about 2 to about 15 nm. In addition, the mesopores each may have a surface area of greater than about 20 square meters per gram ($m^2/g$), specifically about 40 to about 900 $m^2/g$, more specifically about 80 to about 800 $m^2/g$.

The porous oxide catalyst may be prepared using various methods, such as evaporation-induced self-assembly or co-precipitation.

The evaporation-induced self-assembly may be performed in such a way that a metal oxide precursor and an oxygen vacancy-inducing metal precursor are added to a solvent to prepare a mixture, the mixture is dried and aged, and the resulting dried and aged product is sintered to obtain a porous oxide catalyst. The mixture may further include an active metal precursor. In an embodiment, the mixture is a solution.

The solvent may be an alcohol solvent, such as methanol or ethanol, and may be used in combination with acid, such as an aqueous hydrochloric acid solution, an aqueous acetic acid solution, or a combination comprising at least one of the foregoing. The amount of the solvent is not limited, and may be about 0.1 to about 40 parts by weight, specifically about 0.5 to about 35 parts by weight, more specifically about 1 to about 30 parts by weight, based on 100 parts by weight of the metal oxide precursor.

The solvent is contacted (e.g., mixed) with the metal oxide precursor, the oxygen vacancy-inducing metal precursor, and the active metal precursor (if desired) to prepare the mixture.

A template may be further added to the solvent. The template may function as a backbone when a metal oxide is formed, and may be, for example, a neutral surfactant. Examples of the neutral surfactant include a polyethyleneoxide/polypropyleneoxide/polyethyleneoxide ("PEO/PPO/PEO") triblock copolymer, such as Pluronic® F108, F127, available from BASF.

The oxygen vacancy-inducing metal precursor used in the preparation of the porous oxide catalyst may be at least one of an alkoxide, a halide, a nitrate, a hydrochloride, a sulfate, or an acetate of at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), rhodium (Rh), palladium (Pd), silver (Ag), cadmium (Cd), indium (In), tin (Sn), tantalum (Ta), tungsten (W), iridium (Ir), platinum (Pt), gold (Au), lead (Pb), or bismuth (Bi).

The metal oxide precursor used in the preparation of the porous oxide catalyst may be at least one of an alkoxide, a halide, a nitrate, a hydrochloride, a sulfate, or an acetate of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth. For example, the metal oxide precursor may be at least one of an alkoxide, a halide, a nitrate, a hydrochloride, a sulfate, or an acetate of at least one of silicon (Si), aluminum (Al), titanium (Ti), zirconium (Zr), or cerium (Ce), but is not limited thereto.

When a single type of the metal oxide precursor is used in the preparation of the porous oxide catalyst, a single metal oxide may be formed (e.g., the metal oxide may be a single-phase material), and when a plurality of the metal oxide precursors are used, a plurality of metal oxides may be formed, e.g., a multiple metal oxide or a mixture of different metal oxides. A carrier of the single metal oxide may be ZnO, $TiO_2$ or $SiO_2$, and a carrier of the multiple metal oxide may be at least one of $Ce_xZr_{1-x}O_2$ wherein x is greater than or equal to 0 and less than or equal to about 1, $SiO_2$—$Al_2O_3$, $SiO_2$—$ZrO_2$, $Al_2O_3$—$ZrO_2$, or $CeO$—$ZrO_2$.

The active metal precursor may be at least one of an alkoxide, a halide, a nitrate, a hydrochloride, a sulfate, or an acetate of at least one of platinum (Pt), palladium (Pd), ruthenium (Ru), rhodium (Rh), nickel (Ni), copper (Cu), silver (Ag), or gold (Au), but is not limited thereto.

The mixture including the solvent, the metal oxide precursor, the oxygen vacancy-inducing metal, and the active metal precursor (if present), and optionally further including the acid or the template (if desired) may be stirred at room temperature for about 0.1 to about 10 hours, specifically about 1 to about 8 hours, more specifically about 5 hours, to uniformly disperse each component in the mixture.

The resulting mixture may be exposed to air and maintained at room temperature, specifically about 10 to about 30 degrees centigrade (° C.), more specifically about 20° C., and at atmospheric pressure, specifically at about 50 to about 101 kilopascals (kPa), more specifically about 75 to about 100 kPa, for about 1 to about 100 hours, specifically about 2 to about 90 hours, more specifically about 4 to about 80 hours, to remove volatile solvent components included in the mixture. The time the resulting mixture is maintained at room temperature and atmospheric pressure is not particularly limited, and may be long enough to effectively remove the volatile solvent components.

The resulting product obtained after the volatile solvent components are removed may be subjected to an aging process, if desired, and the aging process may enhance binding between atoms of the resulting product. The aging process may be performed in air at a temperature of about 30 to about 100° C., specifically about 40 to about 90° C., more specifically about 50 to about 80° C., for about 6 to about 48 hours, specifically about 8 to about 36 hours, more specifically about 10 to about 24 hours.

Then, the resulting product obtained after the aging process is sintered (e.g. heat treated) so that each precursor is in the form of an oxide. The sintering process may be performed in air at a temperature of about 300 to about 1,000° C., specifically about 350 to about 600° C., more specifically about 400 to about 500° C., for about 0.1 to about 30 hours, specifically about 1 to about 10 hours, more specifically about 2 to about 8 hours.

Each precursor is converted to a metal oxide by the sintering process. The metal oxide may comprise a mesoporous structure, and the oxygen vacancy-inducing metal is disposed on (e.g., inserted and/or substituted into) a lattice structure of the metal oxide.

The porous metal oxide catalyst may be prepared using co-precipitation. The co-precipitation, which is a method of preparing the porous oxide catalyst, may be performed in such a way that an aqueous basic solution is added to an aqueous dispersion including the metal oxide precursor, the oxygen vacancy-inducing metal precursor, and optionally the active metal precursor to form a precipitate in the form of a hydroxide. The precipitate may be isolated by filtration and washed, and the precipitate then sintered to obtain a porous oxide catalyst. In this regard, the type of the precursor and sintering conditions may be the same as those used in the evaporation-induced self-assembly method.

The evaporation-induced self-assembly method may be used to obtain a substantially uniform porous oxide catalyst having pores having a narrow range of pore size, for example a pore size range of about 0.1 to about 5 nanometers, specifically about 0.5 to about 3 nanometers, more specifically about 1 nanometer, and the co-precipitation may be used to prepare a porous oxide catalyst having pores having a wide range of pore size, for example a pore size range of about 1 to about 50 nanometers, specifically about 2 to about 40 nanometers, more specifically about 4 to about 30 nanometers.

The porous oxide catalyst may be prepared by sintering the precursors disclosed above, and thus may be prepared at low cost, and a complex catalyst having a high pore content and high efficiency may be prepared at low cost.

While not wanting to be bound by theory, it is believed that the porous oxide catalyst as prepared above has enhanced VOC oxidation efficiency due to the oxygen vacancy that is easily formed on the surface of the porous metal oxide. Thus, the porous oxide catalyst may be used as a catalyst for removing any kind of VOC. For example, when an apparatus for removing a VOC including the porous oxide catalyst is used in an electronic product for home furniture or office equipment, any type of VOC generated therefrom may be oxidized and/or decomposed and effectively removed.

A VOC such as formaldehyde may be emitted from home furniture, such as a sofa, a bed, or a wardrobe. When the porous oxide catalyst is used in such home furniture, it is possible to substantially decrease or effectively eliminate emission of a VOC. In addition, a degenerative VOC, such as toluene, phenol, or butanol, or a non-degenerative VOC, such as a siloxane, or a nanodust such as that generated in a printer, may be effectively removed or the content substantially decreased. Furthermore, a VOC such as formaldehyde, toluene, or ammonia, a particulate matter, a pathogenic bacteria such as that which may be found in an air-conditioner or an air cleaner, a particulate matter or a VOC generated in or emitted from a vacuum cleaner, or the smell of a VOC that may be generated or emitted from a refrigerator, may be effectively removed or a content thereof substantially decreased.

Representative embodiments will now be described in more detail with reference to the following examples. However, these examples are not intended to limit the scope of the disclosed embodiments.

Example 1

Preparation of $Ce_{0.85}Cu_{0.05}Zr_{0.1}O_{1.95}$

Ethanol, 30 milliliters (mL), hydrochloric acid: 1.97 ml, Pluronic® F127 (available from BASF): 4.6 g, acetic acid: 2.4 g, $Ce(NO_3)_3$: 9.23 g (metal precursor molar ratio: 0.85), $Cu(NO_3)_2$: 0.3 g (metal precursor molar ratio: 0.05), and zirconium butoxide $(Zr(OBu)_4)$: 1.2 g (metal precursor molar ratio: 0.1) were added to a beaker, and stirred at room temperature for 5 hours. Subsequently, the stirred mixture was dried at room temperature for 2 days and aged at 338 Kelvin (K) for 12 hours. The resulting product was dried at 673 K for 5 hours to prepare a porous oxide catalyst.

The metal precursors were used in amounts based on the total amount of 1 mole of the porous oxide catalyst so that Cu was stoichiometrically substituted into a lattice structure of the metal oxide.

Example 2

Preparation of $Cu_{0.05}$—$Ce_{0.9}Zr_{0.1}O_2$

Ethanol: 30 mL, hydrochloric acid: 1.97 ml, Pluronic® F127: 4.6 g, acetic acid: 2.4 g, $Ce(NO_3)_3$: 9.77 g (metal precursor molar ratio: 0.9), $Cu(NO_3)_2$: 0.3 g (metal precursor molar ratio: 0.05), and $Zr(OBu)_4$: 1.2 g (metal precursor molar ratio: 0.1) were added to a beaker, and stirred at room temperature for 5 hours. Subsequently, the stirred mixture was dried at room temperature for 2 days and aged at 338 K for 12 hours. The resulting product was dried at 673 K for 5 hours to prepare a porous oxide catalyst.

The metal precursors were used in amounts based on the total amount of 1.05 mole of the porous oxide catalyst so that a stoichiometric excess of Cu was inserted into a lattice structure of the metal oxide.

Example 3

Preparation of Pd (1 wt %)/$Ce_{0.85}Cu_{0.05}Zr_{0.1}O_{1.95}$

Ethanol: 30 mL, hydrochloric acid: 1.97 mL, Pluronic® F127: 4.6 g, acetic acid: 2.4 g, $Ce(NO_3)_3$: 9.23 g (metal precursor molar ratio: 0.85), $Cu(NO_3)_2$: 0.3 g (metal precursor molar ratio: 0.05), $Zr(OBu)_4$: 1.2 g (metal precursor molar ratio: 0.1), and $Pd(NO_3)_2$: 0.1 g (1 wt %) were added to a beaker, and stirred at room temperature for 5 hours. Subsequently, the stirred mixture was dried at room temperature for 2 days and the dried mixture aged at 338 K for 12 hours. The resulting product was dried at 673 K for 5 hours to prepare a porous oxide catalyst.

Example 4

A 7.38 g quantity of $Ce(NO_3)_3$ (metal precursor molar ratio: 0.85), 0.24 g of $Cu(NO_3)_2$ (metal precursor molar ratio: 0.05), and 0.68 g of $Zr(OBu)_4$ (metal precursor molar ratio: 0.1) were added to a beaker together with 100 mL of water to prepare a mixed solution. A solution of 2.33 g of NaOH dissolved in 100 mL of water was slowly dropped into the mixed solution, and the resulting solution was stirred at room temperature for 6 hours to form a precipitate in the form of a hydroxide. Subsequently, the precipitate was isolated by filtration, the precipitate was washed with deionized water, and the washed precipitate was dried at 373 K for 12 hours. The dried precipitate was sintered at 673 K for 5 hours to prepare a porous oxide catalyst.

Comparative Example 1

Preparation of $Ce_{0.9}Zr_{0.1}O_2$

Ethanol: 30 mL, Pluronic® F127: 4.6 g, hydrochloric acid: 1.97 mL, acetic acid: 2.4 g, $Ce(NO_3)_3$: 9.77 g (metal precursor molar ratio: 0.9), and $Zr(OBu)_4$: 1.2 g (metal precursor molar ratio: 0.1) were added to a beaker, and stirred at room temperature for 5 hours. Subsequently, the resulting mixture was dried at room temperature for 2 days, and aged at 338 K for 12 hours. The resulting product was dried at 673 K for 5 hours to prepare a porous oxide catalyst.

Comparative Example 2

Preparation of $Ce_{0.9}Zr_{0.1}O_2$

A 7.82 g quantity of $Ce(NO_3)_3$ (metal precursor molar ratio: 0.9) and 0.68 g of $Zr(OBu)_4$ (metal precursor molar ratio: 0.1) were added to a beaker together with 100 mL of water to prepare a mixed solution. A solution of 2.37 g of NaOH dissolved in 100 mL of water was slowly dropped into the mixed solution, and the resulting solution was stirred at room temperature for 6 hours to form a precipitate in the form of a hydroxide. Subsequently, the precipitate was isolated by filtration, the precipitate was washed with deionized water, and the washed precipitate was dried at 373 K for 12 hours. The dried precipitate was sintered at 673 K for 5 hours to prepare a porous oxide catalyst.

Experimental Example 1

Inductively Coupled Plasma ("ICP") atomic analysis was performed on the porous oxide catalyst prepared according to Example 1 and Comparative Example 1. According to the analysis, the amounts of Ce and Zr in the porous oxide catalyst of Comparative Example 1 were 66.87 weight percent (wt %) and 5.64 wt %, respectively, and the amounts of Ce, Zr, and Cu in the porous oxide catalyst of Example 1 were 64.62 wt %, 5.42 wt %, and 1.75 wt %, respectively.

Experimental Example 2

Confirmation of Crystalline Structure

Figure 3:
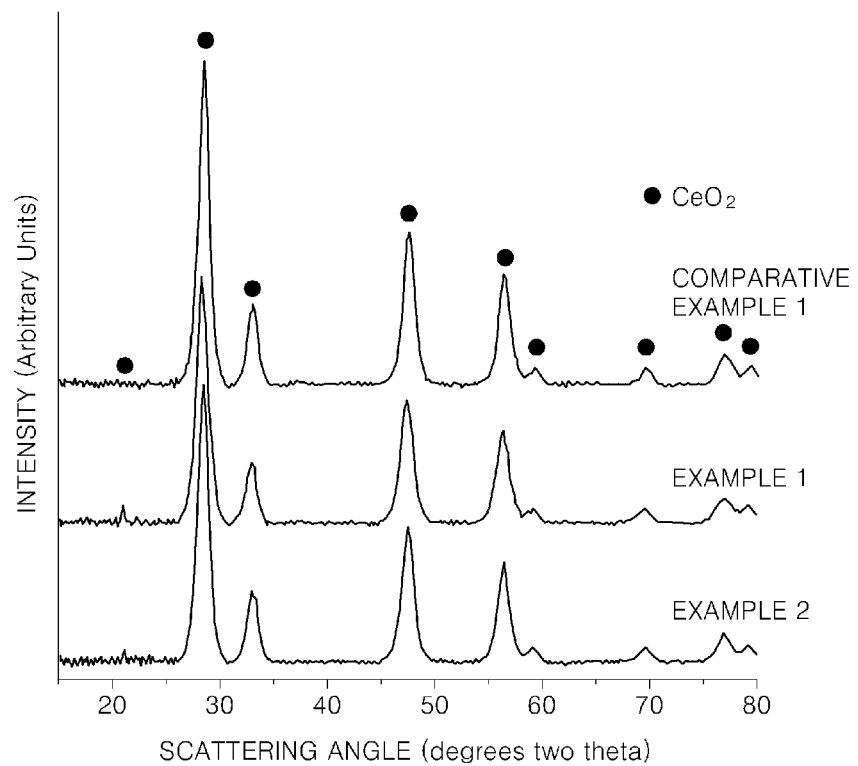
FIG. 3 is a graph of intensity (arbitrary units) versus scattering angle (degrees two theta, 2θ) showing X-ray diffraction ("XRD") results of porous oxide catalysts prepared according to Examples 1 and 2 and Comparative Example 1, in which the results are offset in intensity for clarity.

X-ray diffraction ("XRD") analysis was performed on the porous oxide catalysts of Examples 1 and 2 and Comparative Example 1, all of which used evaporation-induced self-assembly, and the results are shown in FIG. 3. Referring to FIG. 3, the porous oxide catalysts of Examples 1 and 2 and Comparative Example 1 all have a $CeO_2$-type crystal structure, and from the results, it is confirmed that Cu is stably substituted or inserted into a lattice structure of each of the porous oxide catalysts of Examples 1 and 2.

Experimental Example 3

Porosity Measurement

Figure 4:
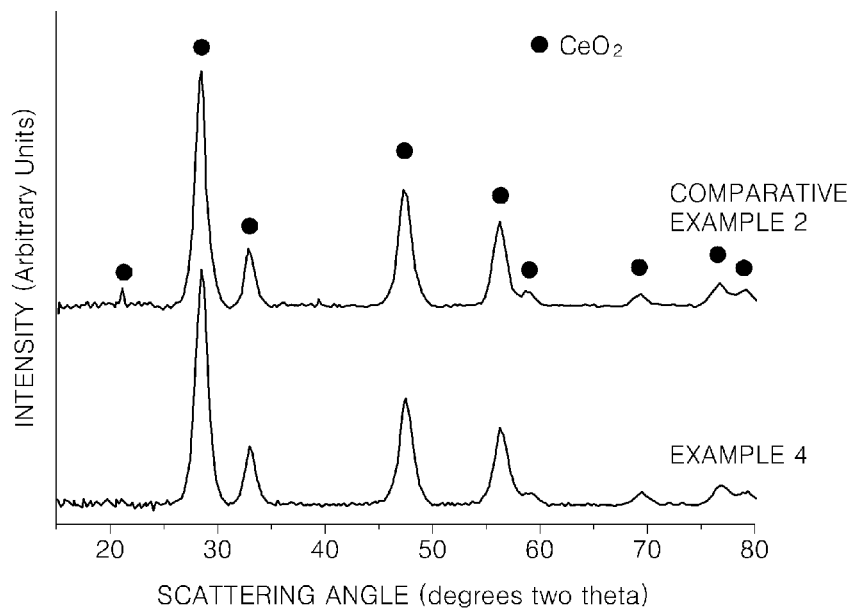
FIG. 4 is a graph of intensity (arbitrary units) versus scattering angle (degrees two theta, 2θ) showing XRD results of porous oxide catalysts prepared according to Example 4 and Comparative Example 2, in which the results are offset in intensity for clarity.

XRD analysis was performed on the porous oxide catalysts of Example 4 and Comparative Example 2 obtained by evaporation-induced self-assembly, and the results are shown in FIG. 4. Referring to FIG. 4, the porous oxide catalysts of Example 4 and Comparative Example 2 all have a $CeO_2$-type crystal structure, and from the results, it is confirmed that Cu is stably substituted or inserted into a lattice structure of the porous oxide catalyst of Example 4.

Experimental Example 4

Figure 5A:
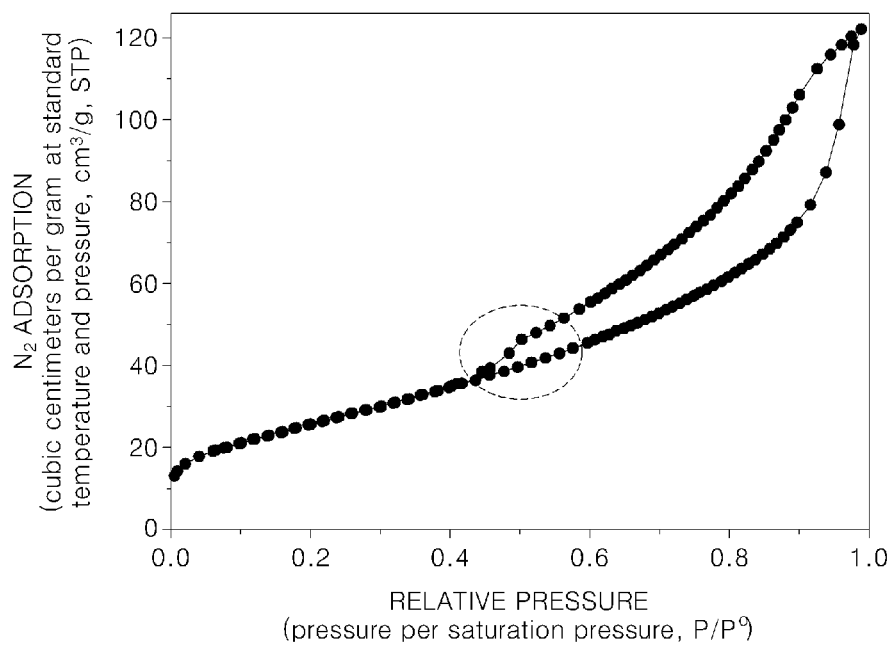
FIG. 5A is a graph of nitrogen adsorption (cubic centimeters per gram at standard temperature and pressure, cm$^3$/g, STP) versus relative pressure (pressure per saturation pressure, P/P$^0$) showing results in which N$_2$ is adsorbed on a porous oxide catalyst prepared according to Example 1.
Figure 5B:
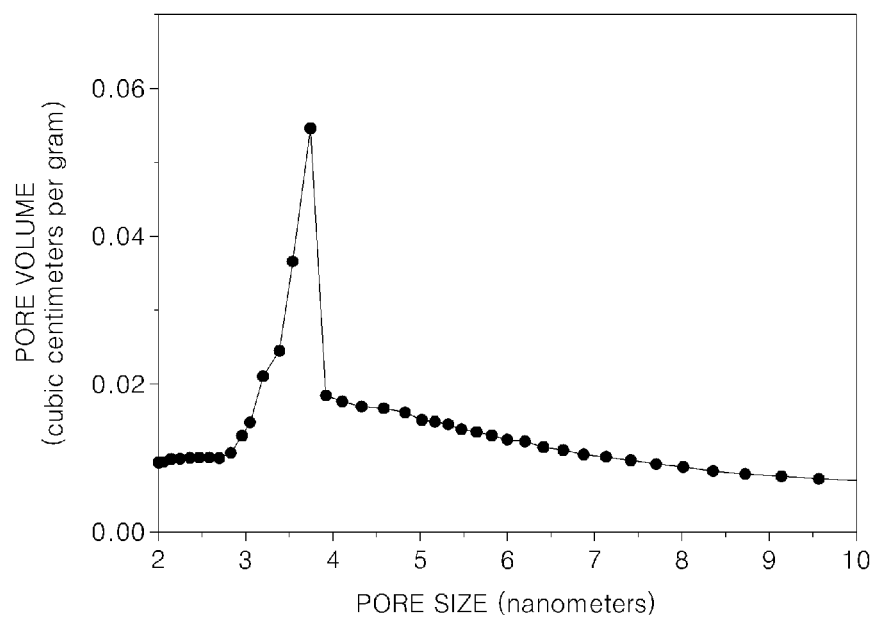
FIG. 5B is a graph of pore volume (cubic centimeters per gram, cm$^3$/g) with respect to pore size (nanometers, m) of a porous oxide catalyst prepared according to Example 1.

$N_2$ Absorption Capacity and Measurement of Pore Size $N_2$ absorption capacity and pore volume with respect to pore size of the porous oxide catalyst of Example 1 were measured, and the resultants are respectively illustrated in FIGS. 5A and 5B. Referring to FIG. 5A, it is confirmed from the shape of the adsorption and desorption isotherms that the porous oxide catalyst is porous, in particular, from a region of the isotherms where $N_2$ is desorbed, which is indicated by a circle in the graph of FIG. 5A. Referring to FIG. 5B, it is confirmed that the porous oxide catalyst of Example 1 has a uniform porous structure having a pore size of about 3.7 nm. The BET surface area and the total pore volume of the porous oxide catalyst of Example 1 are 95.140 square meters per gram ($m^2/g$) and 0.1883 cubic centimeters per gram ($cm^3/g$), respectively. Regarding BET surface area, see, E. P. Barrett, L. G. Joyner, P. P. Halenda, The determination of pore volume and area distributions in porous substances. I. Computations from nitrogen isotherms, J. Am. Chem. Soc. (1951), 73, 373-380).

Figure 6A:
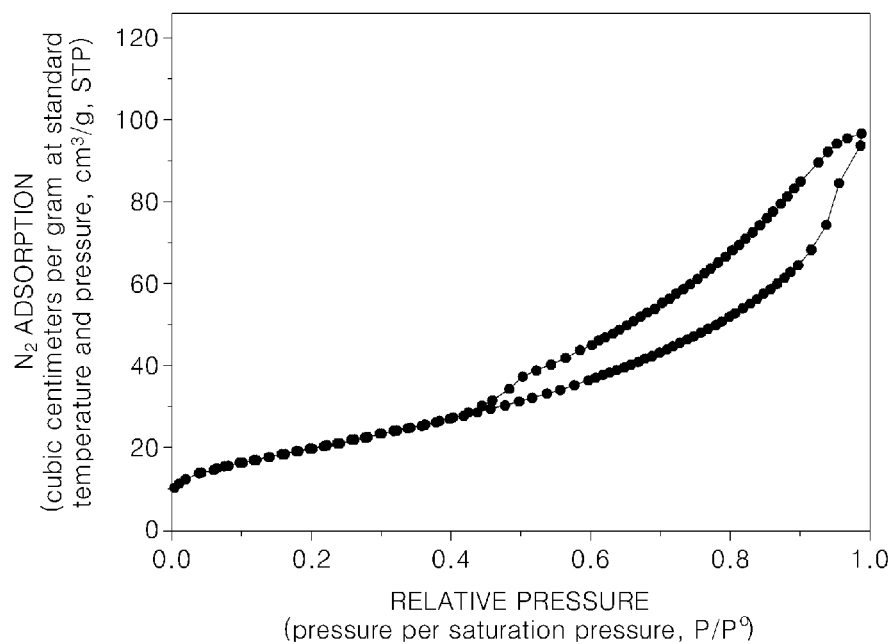
FIG. 6A is a graph of nitrogen adsorption (cubic centimeters per gram at standard temperature and pressure, cm$^3$/g, STP) versus relative pressure (pressure per saturation pressure, P/P$^0$) showing results in which N$_2$ is adsorbed on a porous oxide catalyst prepared according to Example 2.
Figure 6B:
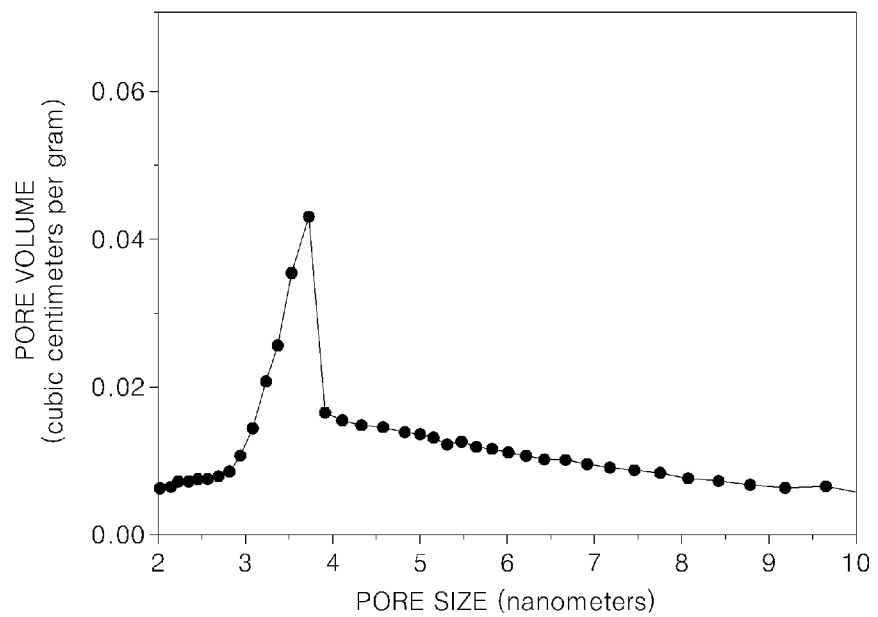
FIG. 6B is a graph of pore volume (cubic centimeters per gram, cm$^3$/g) with respect to pore size (nanometers, m) of a porous oxide catalyst prepared according to Example 2.

$N_2$ absorption capacity and pore volume with respect to pore size of the porous oxide catalyst of Example 2 were measured, and the results are respectively illustrated in FIGS. 6A and 6B. As described above in connection with FIG. 5A, it is confirmed from the shape of the adsorption and desorption isotherms and a shape of $N_2$ desorption shown in FIG. 6A that the porous oxide catalyst is porous. Referring to FIG. 6B, it is confirmed that the porous oxide catalyst of Example 2 has a uniform porous structure having a pore size of about 3.7 nm. The BET surface area and the total pore volume of the porous oxide catalyst of Example 2 are 74.533 $m^2/g$ and 0.1499 $cm^3/g$, respectively.

Figure 7A:
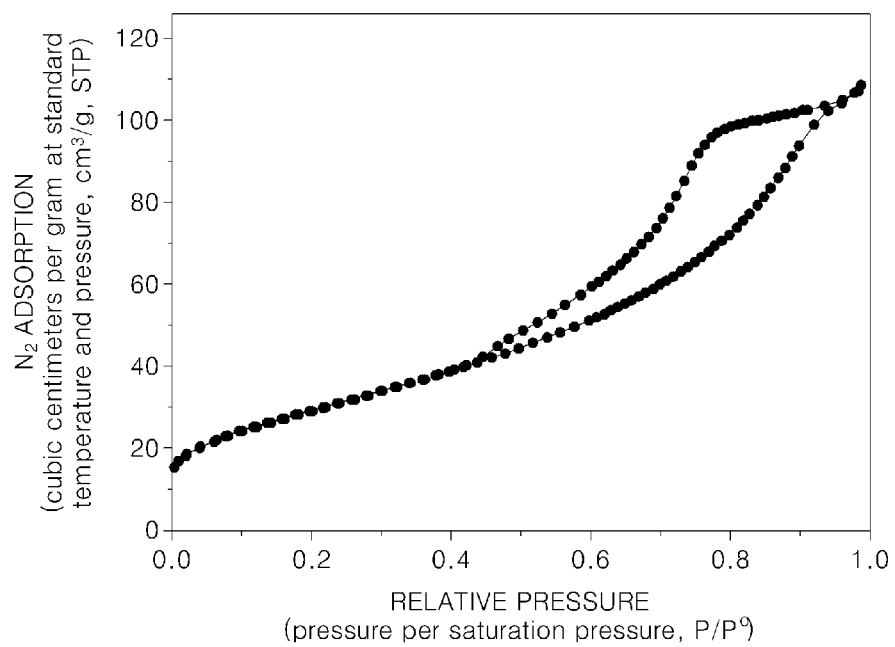
FIG. 7A is a graph of nitrogen adsorption (cubic centimeters per gram at standard temperature and pressure, cm$^3$/g, STP) versus relative pressure (pressure per saturation pressure, P/P$^0$) showing results in which N$_2$ is adsorbed on a porous oxide catalyst prepared according to Example 4.
Figure 7B:
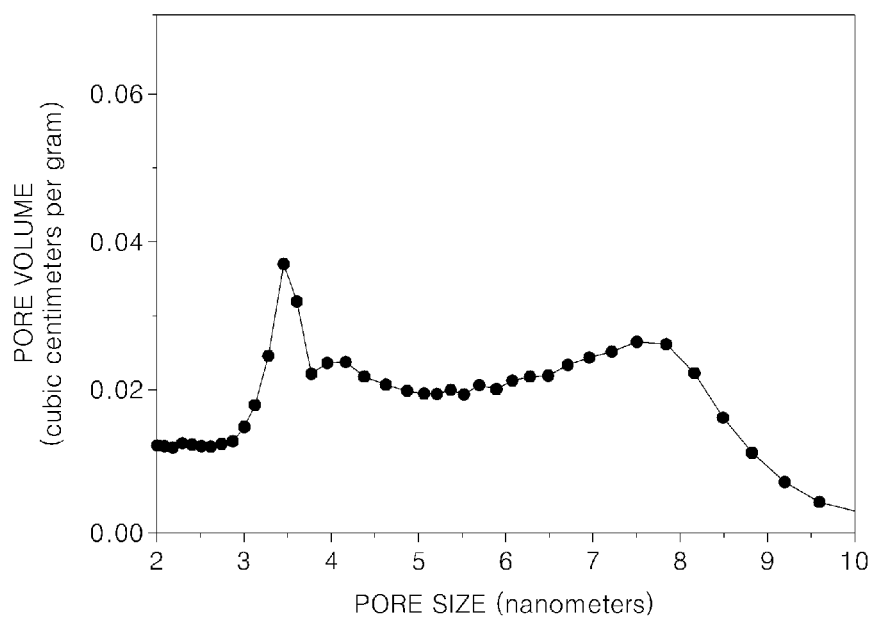
FIG. 7B is a graph of pore volume (cubic centimeters per gram, cm$^3$/g) with respect to pore size (nanometers, m) of a porous oxide catalyst prepared according to Example 4.

$N_2$ absorption capacity and pore volume with respect to pore size of the porous oxide catalyst of Example 4 were measured, and the results are respectively illustrated in FIGS. 7A and 7B. Referring to FIG. 7A, it is confirmed from the shape of the adsorption and desorption isotherms that that the porous oxide catalyst is porous. Referring to FIG. 7B, it is confirmed that the porous oxide catalyst of Example 4 has various pore sizes of about 3.4 to about 7.6 nm, unlike the results illustrated in FIGS. 5B and 6B. The BET surface area and the total pore volume of the porous oxide catalyst of Example 4 are 107.514 $m^2/g$ and 0.1678 $cm^3/g$, respectively.

Figure 8A:
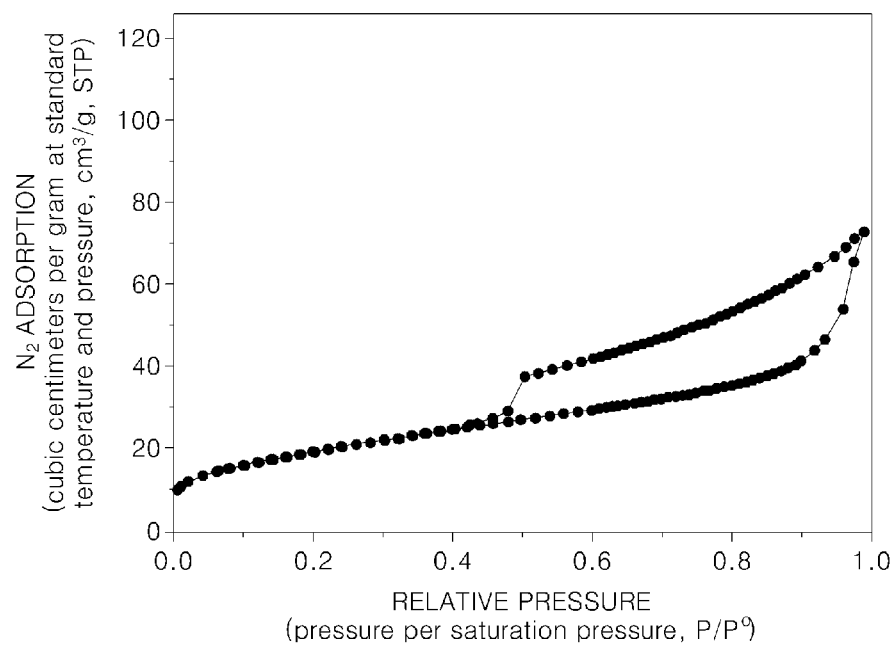
FIG. 8A is a graph of nitrogen adsorption (cubic centimeters per gram at standard temperature and pressure, cm$^3$/g, STP) versus relative pressure (pressure per saturation pressure, P/P$^0$) showing results in which N$_2$ is adsorbed on a porous oxide catalyst prepared according to Comparative Example 1.
Figure 8B:
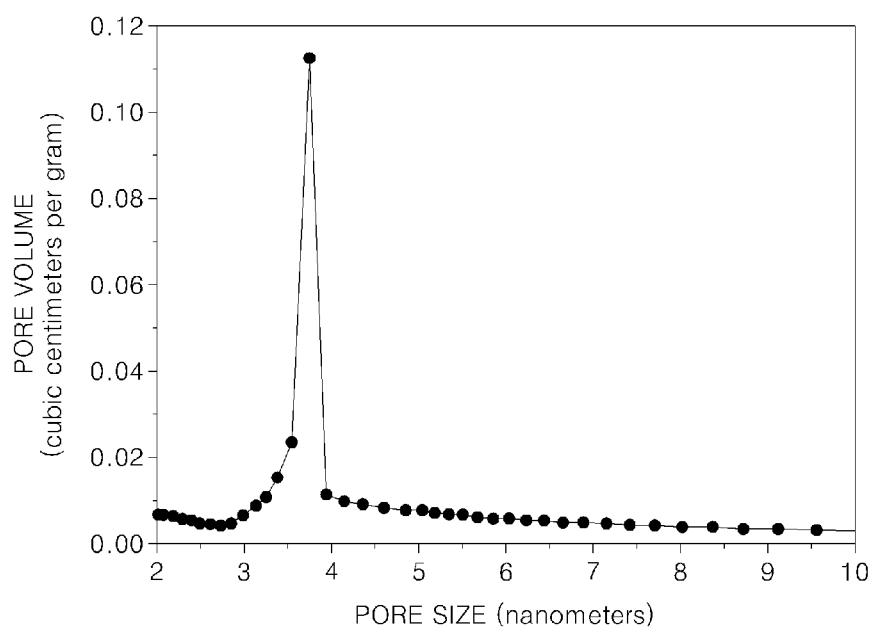
FIG. 8B is a graph of pore volume (cubic centimeters per gram, cm$^3$/g) with respect to pore size (nanometers, m) of a porous oxide catalyst prepared according to Comparative Example 1.

$N_2$ absorption capacity and pore volume with respect to pore size of the porous oxide catalyst of Comparative Example 1 were measured, and the results are respectively illustrated in FIGS. 8A and 8B. Referring to FIG. 8A, it is confirmed from the shape of the adsorption and desorption isotherms and the shape of $N_2$ desorption that the porous oxide catalyst is porous. Referring to FIG. 6B, it is confirmed that the porous oxide catalyst of Comparative Example 1 has a uniform pore structure having a pore size of about 3.7 nm. The BET surface area and the total pore volume of the porous oxide catalyst of Comparative Example 1 are 70.957 $m^2/g$ and 0.1111 $cm^3/g$, respectively.

Figure 9A:
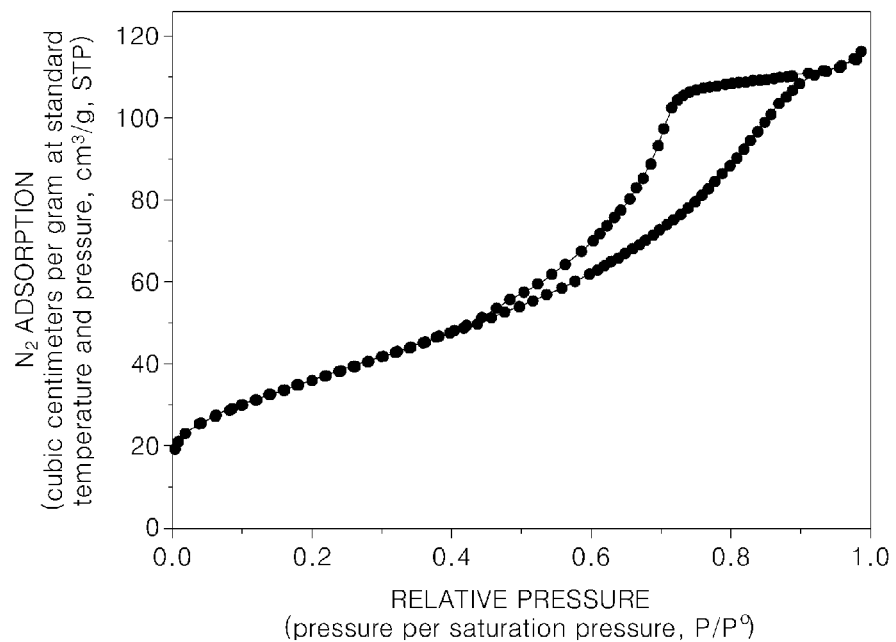
FIG. 9A is a graph of nitrogen adsorption (cubic centimeters per gram at standard temperature and pressure, cm$^3$/g, STP) versus relative pressure (pressure per saturation pressure, P/P$^0$) showing results in which N$_2$ is adsorbed on a porous oxide catalyst prepared according to Comparative Example 2.
Figure 9B:
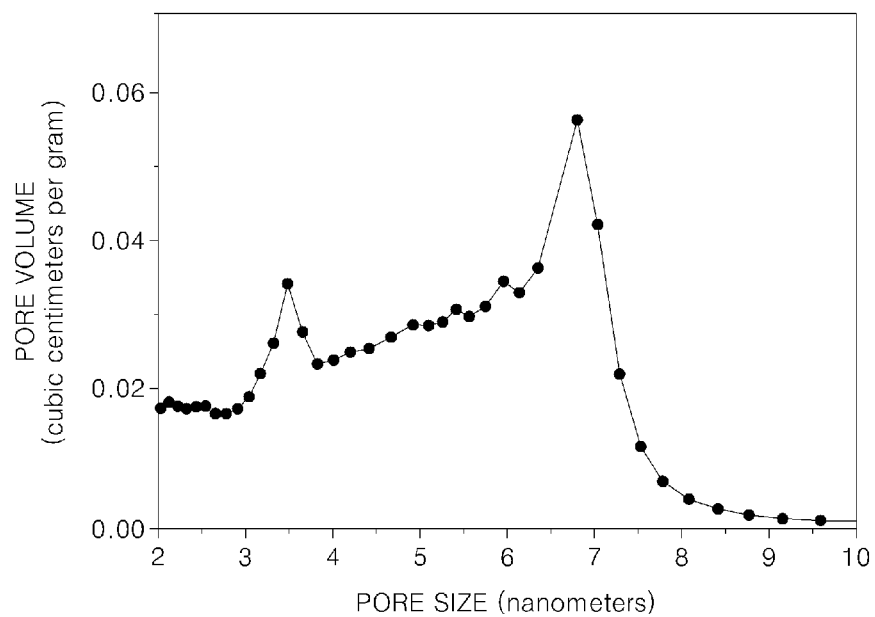
FIG. 9B is a graph of pore volume (cubic centimeters per gram, cm$^3$/g) with respect to pore size (nanometers, m) of a porous oxide catalyst prepared according to Comparative Example 2.

N₂ absorption capacity and pore volume with respect to pore size of the porous oxide catalyst of Comparative Example 2 were measured, and the results are respectively illustrated in FIGS. 9A and 9B. Referring to FIG. 9A, it is confirmed from a shape of adsorption and desorption isotherms that the porous oxide catalyst is porous. Referring to FIG. 9B, it is confirmed that the porous oxide catalyst of Comparative Example 1 has various pore sizes of about 3.5 to about 6.8 nm, unlike the results illustrated in FIG. 8B. The BET surface area and the total pore volume of the porous oxide catalyst of Comparative Example 2 are 131.832 $m^2/g$ and 0.1776 $cm^3/g$, respectively.

Whether the pore size is uniform or varies depends on preparation processes. When evaporation-induced self-assembly is used, the porous oxide catalyst has a uniform pore size; on the other hand, when co-precipitation is used, the porous oxide catalyst has a varying pore size.

Experimental Example 5

Measurement of Oxidation State

Figure 10:
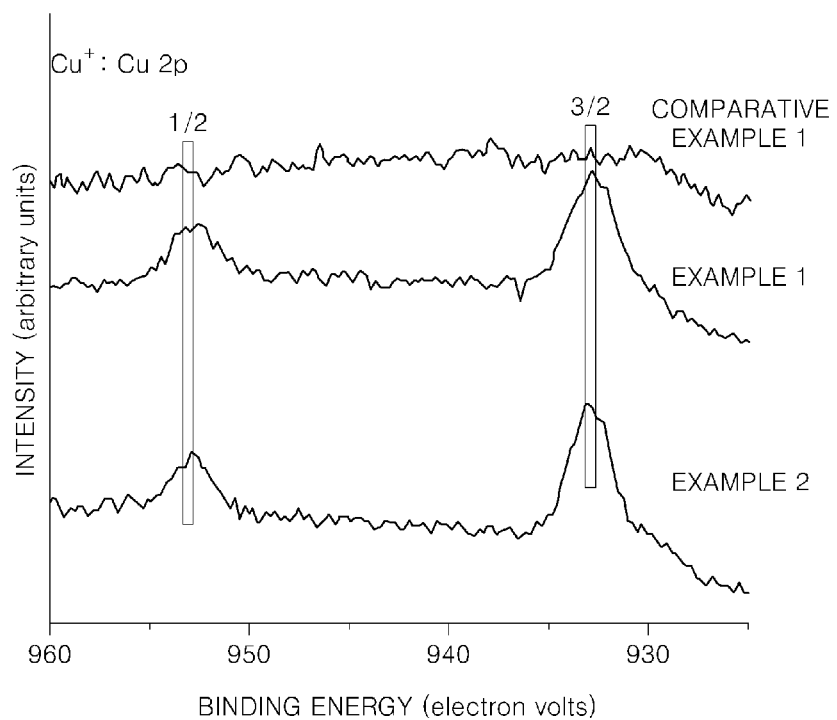
FIG. 10 is a graph of intensity (arbitrary units) versus binding energy (electron volts, eV) showing results of X-ray photoelectron Spectroscopy ("XPS") analysis which show an oxidation state of Cu included in porous oxide catalysts prepared according to Examples 1 and 2 and Comparative Example 1, in which the results are offset in intensity for clarity.
Figure 11:
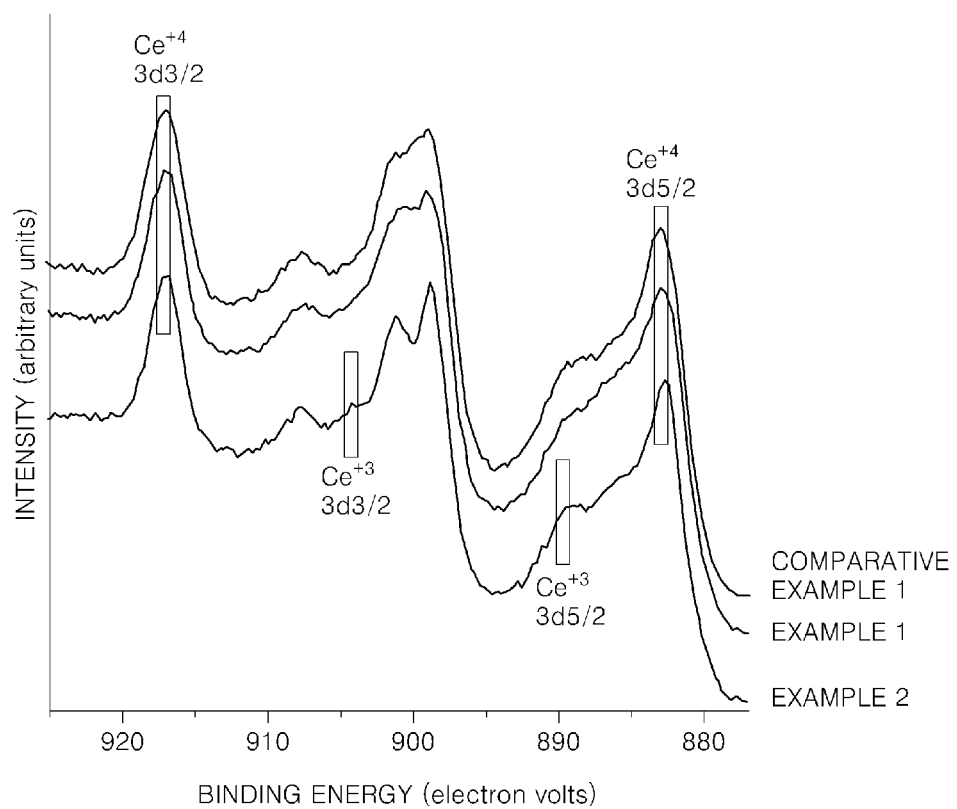
FIG. 11 is a graph of intensity (arbitrary units) versus binding energy (electron volts, eV) showing results of XPS analysis which show an oxidation state of Ce included in porous oxide catalysts prepared according to Examples 1 and 2 and Comparative Example 1, in which the results are offset in intensity for clarity.
Figure 12:
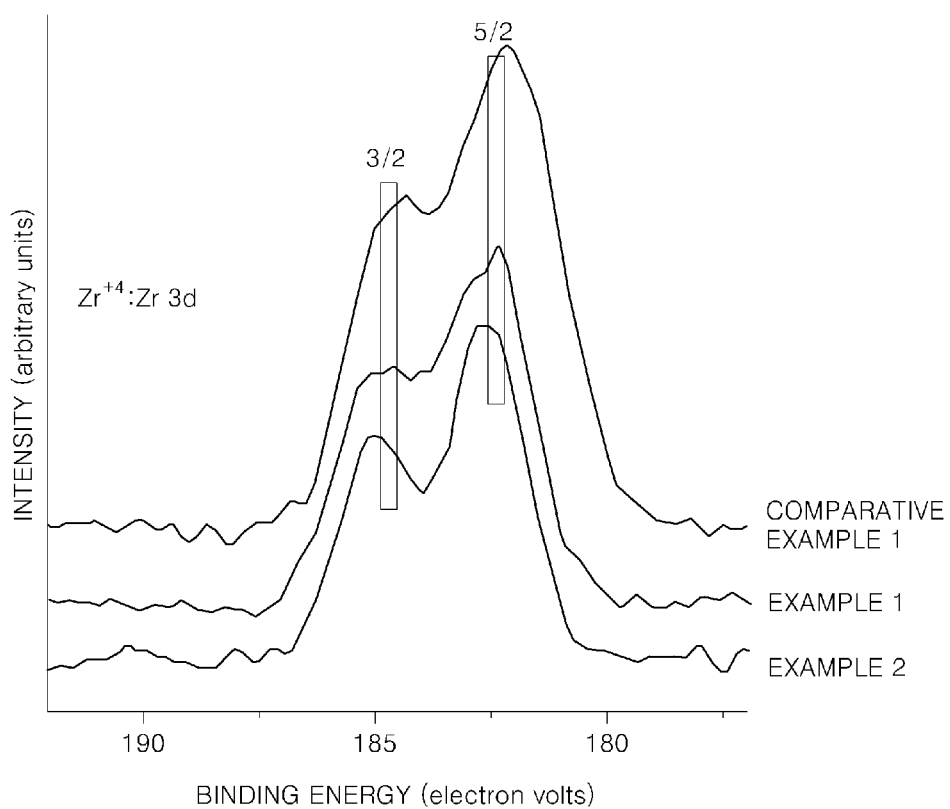
FIG. 12 is a graph of intensity (arbitrary units) versus binding energy (electron volts, eV) showing results of XPS analysis which show an oxidation state of Zr included in porous oxide catalysts prepared according to Examples 1 and 2 and Comparative Example 1, in which the results are offset in intensity for clarity.

X-ray Photoelectron spectroscopy ("XPS") analysis was performed on the porous oxide catalysts of Examples 1 and 2 and Comparative Example 1 to measure oxidation states of Cu, Ce, and Zr, and the results are respectively illustrated in FIGS. 10, 11, and 12.

Referring to FIG. 10, it is confirmed that Cu in each of the porous oxide catalysts of Examples 1 and 2 has an oxidation number of +1. Although Cu is more stable when having an oxidation number of +2, it is determined that Cu in each porous oxide catalyst has the less stable oxidation number of +1, thereby causing an oxygen vacancy.

Referring to FIG. 11, which illustrates the oxidation number of Ce, it is confirmed that only the porous oxide catalyst of Example 2 has $Ce^{+3}$ even in a small amount. From these results, it is confirmed that Cu existing in an excessive amount affects the oxidation number of Ce.

Referring to FIG. 12, which illustrates the oxidation state of Zr, it is confirmed that the porous oxide catalysts of Examples 1 and 2 and Comparative Example 1 all have Zr having an oxidation number of +4.

Experimental Example 6

Toluene Dissociation Experiment

Oxidation of toluene, measured as a decreased concentration of toluene, by the porous oxide catalyst of Examples 1 through 4 and Comparative Example 1 were measured using a successive heating reactor to perform a toluene dissociation experiment, and the results are shown in the following Table 1.

In Table 1, GHSV refers to Gas Hourly Space Velocity, which may be obtained by dividing flow amount per unit time by volume of catalyst, wherein $h^{-1}$ refers to inverse hours; $T_{50}$ refers to temperature (° C.) of a reactor reaching 50% of dissociation efficiency; $T_{100}$ refers to temperature (° C.) of a reactor reaching 100% of dissociation efficiency, wherein the dissociation efficiency may be determines as (initial concentration-emission concentration)/initial concentration×100; and ppm refers to parts per million.

Referring to Table 1, it is confirmed that Cu is introduced into a lattice structure of each of the porous oxide catalysts of Examples 1 through 4, thereby enhancing the dissociation (e.g., oxidation) performance of the catalyst for toluene, and toluene is dissociated at a low temperature, accordingly. In addition, the porous oxide catalyst of Example 3, which includes the active metal, exhibits the most excellent catalyst activity.

As described above, according to the one or more of the above embodiments, a porous oxide catalyst includes a metal having a low oxidation number that is disposed on (e.g., inserted or substituted into) a lattice structure of a porous metal oxide, thereby forming an oxygen vacancy which may be on the surface of the metal oxide. As a result, oxygen adsorbed onto the oxygen vacancy may be activated, providing enhanced oxidation efficiency and/or decomposition efficiency of a VOC.

It should be understood that the exemplary embodiments described herein should be considered in a descriptive sense only and not for purposes of limitation. Descriptions of features or aspects within each embodiment should be considered as available for other similar features or aspects in other embodiments.

What is claimed is:
1. A porous oxide catalyst comprising:
a porous metal oxide;
an oxygen vacancy-inducing metal that induces an oxygen vacancy in a lattice structure of the porous metal oxide; and
a mesopore having an average diameter of about 2 to about 50 nanometers,
wherein the porous metal oxide is at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth; and
wherein the oxygen vacancy-inducing metal is at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), silver (Ag),

TABLE 1

| Catalyst | | pore volume (nm) | Initial concentration (ppm) | GHSV $h^{-1}$ | $T_{50}$ L | $T_{100}$ L |
|---|---|---|---|---|---|---|
| Example 1 | $Ce_{0.85}Cu_{0.05}Zr_{0.1}O_{1.95}$ | 3.7 | 70 | 24,000 | 339 | 348 |
| Example 2 | $Cu_{0.05}$—$Ce_{0.9}Zr_{0.1}O_2$ | 3.7 | 70 | 24,000 | 312 | 326 |
| Example 3 | Pd (1 wt %)/ $Ce_{0.85}Cu_{0.05}Zr_{0.1}O_{1.95}$ | 3.4~7.6 | 70 | 24,000 | 292 | 300 |
| Example 4 | $Ce_{0.85}Cu_{0.05}Zr_{0.1}O_{1.95}$ | 3.7 | 70 | 24,000 | 338 | 347 |
| Comparative Example 1 | $Ce_{0.9}Zr_{0.1}O_2$ | 3.5~6.8 | 70 | 24,000 | 412 | 420 | cadmium (Cd), indium (In), tin (Sn), tantalum (Ta), tungsten (W), iridium (Ir), gold (Au), lead (Pb), or bismuth (Bi).

2. The porous oxide catalyst of claim 1, further comprising an active metal disposed on a surface of the porous oxide catalyst.

3. The porous oxide catalyst of claim 2, wherein the active metal comprises at least one of platinum, palladium, ruthenium, rhodium, nickel, copper, silver or gold.

4. The porous oxide catalyst of claim 2, wherein the amount of the active metal is about 1 to about 50 parts by weight, based on 100 parts by weight of the porous metal oxide.

5. The porous oxide catalyst of claim 1, wherein the porous metal oxide comprises at least one of ZnO, $TiO_2$, $SiO_2$, $Ce_xZr_{1-x}O_2$ wherein x is greater than or equal to about 0 and less than or equal to about 1, $SiO_2$—$Al_2O_3$, $SiO_2$—$ZrO_2$, $Al_2O_3$—$ZrO_2$, or $CeO_2$—$ZrO_2$.

6. The porous oxide catalyst of claim 1, wherein the oxygen vacancy-inducing metal has a lower oxidation number than that of a metal included in the porous metal oxide.

7. The porous oxide catalyst of claim 1, wherein a ratio of the oxidation number of the oxygen vacancy-inducing metal to the oxidation number of the metal included in the porous metal oxide is less than about 1.

8. The porous oxide catalyst of claim 1, wherein the amount of the oxygen vacancy-inducing metal is about 0.1 to about 20 parts by weight, based on 100 parts by weight of the porous metal oxide.

9. The porous oxide catalyst of claim 1, wherein the oxygen vacancy-inducing metal is disposed in the lattice structure of the porous metal oxide.

10. The porous oxide catalyst of claim 1, wherein the porous oxide catalyst is prepared by evaporation-induced self-assembly or co-precipitation.

11. A pollutant removal device comprising the porous oxide catalyst of claim 1.

12. An apparatus for removing volatile organic compounds, the apparatus comprising the porous oxide catalyst of claim 1.

13. A method of preparing a porous oxide catalyst, the method comprising:
contacting a metal oxide precursor, an oxygen vacancy-inducing metal precursor and a solvent to prepare a mixture;
drying the mixture;
aging the mixture; and
sintering the mixture to prepare the porous oxide catalyst, wherein the porous oxide catalyst comprises
a porous metal oxide;
an oxygen vacancy-inducing metal that induces an oxygen vacancy in a lattice structure of the porous metal oxide; and
a mesopore having an average diameter of about 2 to about 50 nanometers,
wherein the porous metal oxide is at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth, and
wherein the oxygen vacancy-inducing metal is at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), silver (Ag), cadmium (Cd), indium (In), tin (Sn), tantalum (Ta), tungsten (W), iridium (Ir), gold (Au), lead (Pb), or bismuth (Bi).

14. The method of claim 13, wherein the mixture further comprises an active metal precursor.

15. The method of claim 14, wherein the active metal precursor is at least one of an alkoxide, a halide, a nitrate, a hydrochloride, a sulfate, or an acetate of at least one of platinum (Pt), palladium (Pd), ruthenium (Ru), rhodium (Rh), nickel (Ni), copper (Cu), silver (Ag), or gold (Au).

16. The method of claim 13, further comprising adding a template, wherein the template is a neutral surfactant.

17. The method of claim 13, wherein the metal oxide precursor is at least one of an alkoxide, a halide, a nitrate, a hydrochloride, a sulfate, or an acetate of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth.

18. The method of claim 13, wherein the oxygen vacancy-inducing metal precursor is at least one of an alkoxide, a halide, a nitrate, a hydrochloride, a sulfate, or an acetate of at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), rhodium (Rh), palladium (Pd), silver (Ag), cadmium (Cd), indium (In), tin (Sn), tantalum (Ta), tungsten (W), iridium (Ir), platinum (Pt), gold (Au), lead (Pb), or bismuth (Bi).

19. A method of preparing a porous oxide catalyst, the method comprising:
contacting a metal oxide precursor, an oxygen vacancy-inducing metal precursor, and water to prepare an aqueous dispersion;
contacting an aqueous basic solution with the aqueous dispersion to form mixture including a precipitate;
isolating the precipitate; and
sintering the precipitate to prepare the porous oxide catalyst, wherein the porous oxide catalyst comprises
a porous metal oxide;
an oxygen vacancy-inducing metal that induces an oxygen vacancy in a lattice structure of the porous metal oxide; and
a mesopore having an average diameter of about 2 to about 50 nanometers,
wherein the porous metal oxide is at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth, and
wherein the oxygen vacancy-inducing metal is at least one of titanium (Ti), vanadium (V), chromium (Cr), manganese (Mn), iron (Fe), cobalt (Co), nickel (Ni), copper (Cu), zinc (Zn), gallium (Ga), manganese (Ge), zirconium (Zr), niobium (Nb), ruthenium (Ru), silver (Ag), cadmium (Cd), indium (In), tin (Sn), tantalum (Ta), tungsten (W), iridium (Ir), gold (Au), lead (Pb), or bismuth (Bi).

20. The method of claim 19, wherein the aqueous dispersion further comprises an active metal precursor.

21. A porous oxide catalyst comprising:
a porous metal oxide comprising at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth;

an active metal comprising at least one of platinum, palladium, ruthenium, rhodium, nickel, copper, silver or gold;

an oxygen vacancy-inducing metal comprising at least one of at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), silver (Ag), cadmium (Cd), indium (In), tin (Sn), tantalum (Ta), tungsten (W), iridium (Ir), gold (Au), lead (Pb), or bismuth (Bi); and a mesopore having an average diameter of about 2 to about 50 nanometers, wherein the oxygen vacancy-inducing metal has a lower oxidation number than that of a metal of the porous metal oxide.

22. A method of preparing a porous oxide catalyst, the method comprising:

contacting a metal oxide precursor, an oxygen vacancy-inducing metal precursor, an active metal precursor, and water to prepare an aqueous dispersion;

adding an aqueous basic solution to the aqueous dispersion to form a mixture including a precipitate;

isolating the precipitate; and sintering the precipitate to prepare a porous oxide catalyst, wherein metal oxide precursor is at least one of an alkoxide, a halide, a nitrate, a hydrochloride, a sulfate, or an acetate of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth, the oxygen vacancy-inducing metal precursor is at least one of an alkoxide, a halide, a nitrate, a hydrochloride, a sulfate, or an acetate of at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), rhodium (Rh), palladium (Pd), silver (Ag), cadmium (Cd), indium (In), tin (Sn), tantalum (Ta), tungsten (W), iridium (Ir), platinum (Pt), gold (Au), lead (Pb), or bismuth (Bi), and the active metal precursor is at least one of an alkoxide, a halide, a nitrate, a hydrochloride, a sulfate, or an acetate of at least one of platinum (Pt), palladium (Pd), ruthenium (Ru), rhodium (Rh), nickel (Ni), copper (Cu), silver (Ag), or gold (Au), wherein the porous oxide catalyst comprises a porous metal oxide;

an oxygen vacancy-inducing metal that induces an oxygen vacancy in a lattice structure of the porous metal oxide; and a mesopore having an average diameter of about 2 to about 50 nanometers, wherein the porous metal oxide is at least one oxide of at least one of a Group IV element, a Group V element, a Group VI element, a Group VIII element, a Group XI element, a Group XII element, a lanthanide element, aluminum, gallium, indium, thallium, silicon, germanium, tin, lead, phosphorus, arsenic, antimony, or bismuth, and wherein the oxygen vacancy-inducing metal is at least one of titanium (Ti), vanadium (V), chromium (Cr), manganese (Mn), iron (Fe), cobalt (Co), nickel (Ni), copper (Cu), zinc (Zn), gallium (Ga), germanium (Ge), zirconium (Zr), niobium (Nb), ruthenium (Ru), silver (Ag), cadmium (Cd), indium (In), tin (Sn), tantalum (Ta), tungsten (W), iridium (Ir), gold (Au), lead (Pb), or bismuth (Bi).

* * * * *